United States Patent
Xiao et al.

(10) Patent No.: US 12,178,198 B2
(45) Date of Patent: Dec. 31, 2024

(54) WATER BOTTLE FOR PET

(71) Applicants: Leso Rocity (Shenzhen) Industrial Co., Ltd, Guangdong (CN); Shenzhen Rongcheng Innovation Technology Co., LTD, Guangdong (CN)

(72) Inventors: Weijun Xiao, Shenzhen (CN); Fangjian Zhang, Shenzhen (CN)

(73) Assignees: LesoRocity (Shenzhen) Industrial Co., Ltd, Shenzhen (CN); Shenzhen Rongcheng Innovation Technology Co., LTD, Shenzhen (CN)

( * ) Notice: Subject to any disclaimer, the term of this patent is extended or adjusted under 35 U.S.C. 154(b) by 330 days.

(21) Appl. No.: 17/969,598

(22) Filed: Oct. 19, 2022

(65) Prior Publication Data

US 2023/0045609 A1 Feb. 9, 2023

Related U.S. Application Data

(63) Continuation-in-part of application No. 17/020,807, filed on Sep. 15, 2020, now Pat. No. 11,653,625.
(Continued)

(30) Foreign Application Priority Data

Jan. 25, 2022 (CN) .......................... 202210087567.1
Jan. 25, 2022 (CN) .......................... 202230051026.4

(51) Int. Cl.
*A01K 7/00* (2006.01)

(52) U.S. Cl.
CPC ..................................... *A01K 7/00* (2013.01)

(58) Field of Classification Search
CPC .................................... A01K 7/00; A01K 3/16
(Continued)

(56) References Cited

U.S. PATENT DOCUMENTS 3,256,916 A * 6/1966 Silletti ................... B67C 11/04
                                                                                                   210/468
6,971,551 B2 * 12/2005 Widgery ............ A47G 19/2266
                                                                                                  222/145.5
(Continued)

FOREIGN PATENT DOCUMENTS

CN     208434900 U * 1/2019 ............... A45F 3/18
CN     111470178 B * 7/2022 ............... A23L 2/56
(Continued)

*Primary Examiner* — Don M Anderson
*Assistant Examiner* — Eric C Baldrighi
(74) *Attorney, Agent, or Firm* — Ying-Ting Chen

(57) ABSTRACT

A water bottle for pet includes a flexible water bowl, a bottle body and a switch unit, wherein the flexible water bowl has a top opening and a water inlet provided at a bottom thereof, the bottle body is coupled to the flexible water bowl in such a manner that water is allowed to be fed into the flexible water bowl through the water inlet, the switch unit, which is arranged between the flexible water bowl and the bottle body, includes a fixing seat having a water port which is aligned with the water inlet of the flexible water bowl and a displacement valve having a water access hole and a water sealing member, wherein one of the water access hole and the water sealing member is selectively aligned with the water port by relative movement between the displacement valve and the fixing seat, so as to result in open or close of the water port.

25 Claims, 14 Drawing Sheets

Related U.S. Application Data which is a continuation-in-part of application No. 16/550,269, filed on Aug. 25, 2019, now Pat. No. 11,304,404.

(58) Field of Classification Search
USPC .......................................... 119/72; 220/254.9
See application file for complete search history.

(56) References Cited

U.S. PATENT DOCUMENTS

| | | | | |
|---|---|---|---|---|
| 2003/0024929 | A1* | 2/2003 | Smith | B65D 43/0212 |
| | | | | 220/253 |
| 2005/0029265 | A1* | 2/2005 | Morgan | A47G 19/2288 |
| | | | | 220/254.9 |

FOREIGN PATENT DOCUMENTS

| | | | | |
|---|---|---|---|---|
| EP | 3214011 A1 * | 9/2017 | | A45F 3/16 |
| KR | 101421373 B1 * | 7/2014 | | F16K 35/04 |

\* cited by examiner

WATER BOTTLE FOR PET

CROSS REFERENCE OF RELATED APPLICATION

This application is a Continuation-In-Part application that claims the benefit of priority under 35U.S.C. § 120 to a non-provisional application, application Ser. No. 17/020,807, filed on Sep. 15, 2020, which is a Continuation-In-Part application that claims the benefit of priority under 35 U.S.C. § 120 to a non-provisional application, application Ser. No. 16/550,269, filed on Aug. 25, 2019, which claims the benefit of priority under 35 U.S.C. § 119 to a Chinese application number 201821475743.4, filed on Sep. 10, 2018, this application is also a non-provisional application that claims the benefit of priority under 35 U.S.C. § 119 to a Chinese application number 202210087567.1, filed on Jan. 25, 2022, and a Chinese application number 202230051026.4, filed on Jan. 25, 2022, which are incorporated herewith by references in their entities.

BACKGROUND OF THE PRESENT INVENTION

Field of Invention

The present invention relates to the field of pet supplies and products, and more particularly to a water bottle for pet.

Description of Related Arts

With the continuous improvement of people's living standards, raising a pet has become more and more popular, and a variety of pet products have been launched on the market. Water is a necessity for the pet, and water containers for the pet to drink water have become one of the indispensable tools for raising the pet. Conventionally, the pet owner usually uses an ordinary water bowl to store water for the pet to drink. However, due to the limited water capacity of ordinary water bows, the pet owner need to add water from time to time to prevent the pet from drinking insufficient water, and it is extremely easy for the ordinary water bowl to be contaminated with dust and cause water pollution, so that the pet owner often need to replace the water in the water bowl and clean the water bowl to ensure the hygiene of the pet's drinking water, an thus it causes the pet owner to spend a lot of effort in the pet's drinking water.

When the pet owner takes the pet out to play, the pet also need to drink water in time. However, the water bowl is very unfriendly for storage and transportation. More specifically, it is difficult to carry the water bowl along with the pet owner, and after the water bowl is filled with water, the surface of the water bowl will also become wet and is not suitable for being placed in the backpack. At the same time, the shape of the water bowl also causes the water bowl to only have the function of holding water and cannot store water for the pet owner to carry, and thus when using the water bowl for the pet to drink water outdoors, it is very inconvenient because the pet owner has to carry an additional water storage tool, such as a water kettle and a water bottle.

In view of the above mentioned problem, a conventional pet drinking arrangement integrated with a water bowl and a water kettle has appeared in the market to facilitate the pet owner to feed his or her pet. Specifically, the water bowl is integrated on the kettle lid so as to simply incorporate the water bowl with the water kettle for the conventional pet drinking arrangement. During usage, the pet owner twists out the kettle lid to separate the water bowl from the water kettle and pours the water stored in the water kettle into the water bowl for the pet to drink. To a certain extent, the pet's water drinking problem has been improved by the conventional pet drinking arrangement, especially the problem of the pet's outdoor water drinking.

However, although the conventional pet drinking arrangement has improved and solved the pet's drinking water problem to a certain extent, the conventional pet drinking arrangement simply integrates the water bowl with the water kettle, so that it is still very inconvenient for carrying and transportation. More specifically, in order to maintain a water capacity for a single water feeding process, the water bowl of the conventional pet drinking arrangement usually adopts a large-volume water bowl, which causes the water bowl to be abruptly integrated on the kettle lid, so that it is very inconvenient to carry. On the other hand, in the process of pouring water, the pet owner needs to tilt the water bottle so as to allow the water stored in it to flow out under the action of gravity. However, when raising a relatively large pet, it is usually necessary to use a large-volume water kettle to store water to meet the pet's drinking water needs, which leads to that the water kettle is so heavy when it is full of water that it is difficult for the pet owner to keep the water kettle in a tilted state to pour water, or it is easy to cause too much water to be poured at one time and cause water waste. At the same time, when the water bowl is separated from the water kettle, the water bowl is light and easy to be knocked over by the pet, causing the water contained in the water bowl to be wasted and the water bowl to be dirty. In addition, during the use of the conventional pet drinking arrangement, it is inevitable for the pet owner to have direct contact with the water bowl when unscrewing the water bowl and have direct contact with the water during water pouring, and thus it will lead to the transmission of bacteria or other harmful substances to the pet through the pet owner, and vice versa. When the pet is drinking, the pet's oral secretions will remain in the water. Bacteria can grow in the water bowl, which is then passed on to the pet owner when the pet owner touches the water bowl, so that the health risk to both of the pet and the pet owner will be increased.

Furthermore, in some conventional pet water feeding devices, a water switch is disposed in the middle of the water bowl, it will require the pet owner to operate the water switch in the middle of the water bowl, and thus the risk of water pollution is increased. In some other conventional pet water feeding devices, the water switch protruded from the water kettle, so that after it has been stored with water and during the process of transportation and carrying, it is very easy to touch the water switch by mistake, causing the water stored in the water kettle to flow out.

In other words, the conventional water bowls are difficult to meet the water drinking needs of the pet, especially outdoor drinking water needs. Although the conventional pet drinking arrangement has improved and addressed the shortcomings of the conventional water bowls to a certain extent, there are still problems that they are inconvenient to carry and use, as well as hygiene concerns and increased health risks for the pet and the pet owner when using the conventional pet drinking arrangement.

SUMMARY OF THE PRESENT INVENTION

The invention is advantageous in that it provides a water bottle for pet, wherein a water holding mechanism of the water bottle for pet can be flipped and unfolded, so that the volume of the water bottle for pet can be reduced by folding the water holding mechanism during the carrying and transportation of the water bottle for pet, so that the water bottle for pet gives the pet breeder a good experience in use.

Another advantage of the present invention is to provide a water bottle for pet, wherein the water bottle for pet does not need to lift up the water bottle to pour water in a tilting manner, so as to prevent the pet breeder to spend a lot of physical effort to pour water, so that the water bottle for pet is easy to use, and the energy of the pet keeper is saved.

Another advantage of the present invention is to provide a water bottle for pet, wherein the water bottle for pet prevents the pet breeder from directly contacting the water stored in the water bottle for pet during the process of pouring water, thereby reducing the health risk of the pet and the pet breeder.

Another advantage of the present invention is to provide a water bottle for pet, wherein the water bottle for pet comprises a bottle body, wherein the bottle body has a cavity and an opening communicating the cavity to outside, so that the cavity of the tobble body can be filled with pet's drinking water through the opening, and also facilitates cleaning the cavity through the opening, so as to maintain the hygienic state of the water bottle for pet.

Another advantage of the present invention is to provide a water bottle for pet, wherein the water bottle for pet comprises a flexible water bowl, wherein the flexible water bowl has a top opening and a water inlet opened at a bottom thereof, wherein the bottle body is coupled to the flexible water bowl and allows water to be fed into the flexible water bowl through the water inlet, so as to avoid the pet breeder to have direct contact with the water stored in the bottle body when the pet breeder is feeding water into the flexible water bowl through the bottle body, so as to reduce the health risks of the pet and the pet breeder.

Another advantage of the present invention is to provide a water bottle for pet, wherein the flexible water bowl is made of elastic material and can be selectively flipped and unfolded, thus allowing the volume of the water bottle for pet to be reduced by flipping the flexible water bowl, so that the water bottle for pet becomes more compact, so as to facilitate the carrying and transportation of the water bottle for pet, and provide the pet breeder with a good use experience.

Another advantage of the present invention is to provide a water bottle for pet, wherein the top opening of the flexible water bowl is configured in an inclined state, so that the depth and shape of the flexible water bowl can be adapted to the pet's drinking habits, which is convenient for the pet to drink the water contained in the flexible water bowl, so as to reduce the waste of water resources caused by the pet in the process of drinking water.

Another advantage of the present invention is to provide a water bottle for pet, wherein the top opening of the flexible water bowl is configured in an inclined state, so that the pet breeder can hold the bottle body during feeding, and thus the pet can be fed in a physical way, and the pet breeder will not have contact with the pet's saliva during the water feeding process, so that it not only facilitates the use of the water bottle for pet by the pet breeder, but also ensures the hygiene during the use process.

Another advantage of the present invention is to provide a water bottle for pet, wherein the water bottle for pet comprises a switch unit, wherein the switch unit is disposed between the flexible water bowl and the bottle body, wherein the switch unit is suitable for switching between an open state and a closed state to control the conduction and closure of the water delivery passage from the bottle body to the flexible water bowl, so as to freely allow or prohibit the bottle body from feeding the water into the flexible water bowl from the bottle body, so as to realize the control of water delivery by the pet breeder.

Another advantage of the present invention is to provide a water bottle for pet, wherein the switch unit is disposed between the flexible water bowl and the bottle body, so as to prevent the pet breeder from direct and indirect contacting with the water stored in the bottle body during the operation of the water bottle for pet, such as avoiding the direct contact with the water during the process of feeding the water into the flexible water bowl, or avoiding the indirect contact with the water during the opening and closing process of operating the switch unit because of touching the flexible water bowl, so as to reduce the health risks to the pet and the pet breeder.

Another advantage of the present invention is to provide a water bottle for pet, wherein the switch unit comprises a fixing seat and a displacement valve, wherein the fixing seat has a water port, wherein the switch unit is disposed between the flexible water bowl and the bottle body, wherein the water port is aligned with the water inlet of the flexible water bowl, wherein the displacement valve has a water access hole and a water sealing member, and the displacement valve is movable with respect to the fixing seat to selectively align the water access hole or the water sealing member with the water port, so as to open or close the water port by the displacement valve, so as to freely allow or prohibit the bottle body from feeding the water into the flexible water bowl, so as to realize the control of the water supply by the pet breeder.

Another advantage of the present invention is to provide a water bottle for pet, wherein the water bottle for pet controls its water delivery based on the displacement of the displacement valve, so that the pet breeder can apply displacement force to the displacement valve to drive the displacement of the displacement valve, so as to achieve the control of the water delivery, so that the operation of the water bottle for pet can be realized in a simple and easy way, and the direct or indirect contact with the water during the operation process is avoided, rendering the user a good use experience, as well as protecting the health of the pet and the pet breeder.

Another advantage of the present invention is to provide a water bottle for pet, wherein the displacement valve comprises a sealing sleeve member that is adapted to an aperture of the water access hole and the water sealing member, the sealing sleeve member is arranged in a state of surrounding the water access hole and the water sealing member, so as to prevent the sweeping of the water and avoid the waste of water resources.

Another advantage of the present invention is to provide a water bottle for pet, wherein the fixing base comprises two mutually parallel limiting walls disposed on the same side of the fixing base, and a displacement channel is formed between the two limiting walls, wherein the water port is located in the displacement channel, and the displacement valve is arranged in the displacement channel to be displaced in a direction parallel to the limit walls, so as to selectively align the water access hole or the water sealing member with the water port, so as to freely allow or prohibit the bottle body from feeding the water into the flexible water bowl, and avoid direct or indirect contact with the water during the operation.

Another advantage of the present invention is to provide a water bottle for pet, wherein the displacement valve can be ejected out or retracted in the displacement channel, wherein when the displacement valve is retracted in the displacement channel, the water access hole or the water sealing member is aligned with the water port, wherein when in a state in which the displacement valve is ejected out from the displacement channel, and in a state where the displacement valve is received in the displacement channel, the water access hole and the water sealing member are respectively aligned with the water port, so as to result in the open or close of the water port.

Another advantage of the present invention is to provide a water bottle for pet, wherein the switch unit comprises an elastic member, an abutting wall is provided on the fixing seat at one end of displacement channel on the fixing seat, and one end of the elastic member is fixed on the abutting wall, the other end of the elastic member is biasing against the displacement valve, so as to push the displacement valve to pop out from the other end of the displacement channel, so as to allow the water access hole or the water sealing member to align with the water port.

Another advantage of the present invention is to provide a water bottle for pet, wherein the abutting wall is provided with a guiding column which is sleeved by the elastic member to for fixing and guiding the elastic member, so as to avoid unwanted deformation during the compression process of the elastic member, and the structural stability of the switch unit is ensured.

Another advantage of the present invention is to provide a water bottle for pet, wherein a guiding cavity is defined on the side of the displacement valve facing the elastic member, wherein the other end of the elastic member is biasing against the cavity wall of the guiding cavity, so as to guide the movement direction of the displacement valve driven by the elastic member via the guiding cavity, so as to ensure that the displacement valve can be displaced in the displacement channel in a direction parallel to the limiting walls.

Another advantage of the present invention is to provide a water bottle for pet, wherein the switch unit comprises a positioning rod, wherein the positioning rod has two connecting arms extending from both ends thereof in the same radial direction, wherein one of the connecting arms the positioning rod is connected to the fixing seat, and the other connecting arm of the positioning rod is connected to the displacement valve, so as to retain the displacement valve in the displacement channel, and prevent the displacement valve from falling off in the displacement channel, so as to ensure the working stability and structural stability of the switch unit.

Another advantage of the present invention is to provide a water bottle for pet, wherein one of the limiting walls of the fixing base is provided with a rod retaining hole, wherein one of the connecting arms of the positioning rod is engaged with the rod retaining hole to connect the positioning rod to the fixing seat, wherein the side of the displacement valve facing the limit wall which is connected to the positioning rod is provided with a rod displacement groove, wherein when the displacement valve is displaced in the displacement channel, the other connecting arm of the positioning rod moves in the rod displacement groove, wherein the rod displacement groove is provided with a guiding rod retaining buckle including a guiding end and a buckle end, wherein when the displacement valve is received in the displacement channel, the other connecting arm is buckled with the buckle end of the guiding rod retaining buckle to retain the displacement valve in position and prevent the displacement valve from being pushed by the elastic member, so as to maintain the state that the displacement valve is received in the displacement channel, at this time, because the displacement valve is pulled by the positioning rod and cannot be restored to its state. Wherein the other connecting arm of the positioning rod is disengaged from the buckle end of the guiding rod retaining buckle when the displacement valve is subjected to an external force, the elastic member restores its shape and pushes the displacement valve to protrude from the displacement channel, so as to form a state in which the displacement valve pops up from the displacement channel, wherein when the displacement valve pops up from the displacement, the other connecting arm of the positioning rod is bucked and retained to the edge of the rod displacement groove, so as to prevent the displacement valve from falling off the displacement channel and ensure the working stability and structural stability of the switch unit.

Another advantage of the present invention is to provide a water bottle for pet, wherein the guiding end of the guiding rod retaining buckle is used to guide the movement path of the other connecting arm of the positioning rod in the rod displacement groove. Specifically, in a state where the displacement valve is urged to drive the other connecting arm of the positioning rod to move, the other connecting arm is guided to be engaged with the buckle end of the guiding rod retaining buckle, or the other connecting arm is guided to be buckled with the edge of the displacement groove, so as to retain the displacement valve in the displacement channel or allow the displacement valve to pop out of the displacement channel.

Another advantage of the present invention is to provide a water bottle for pet, wherein the bottle body comprise an opening connecting portion disposed near the opening and surrounding the opening, and the switch unit comprises a cap connecting portion which is matched with the opening connecting portion, wherein the cap connecting portion is arranged on a side opposite to the side of the fixing seat where the limiting walls are provided, and the cap connecting part is suitable for connecting with the opening connecting portion in a detachably connecting manner, so as to facilitate the cleaning of the water bottle for pet and maintain the hygienic state of the water bottle for pet.

Another advantage of the present invention is to provide a water bottle for pet, wherein the switch unit further comprises a sealing ring which is arranged in an inner space of the cap connecting portion, so as to be connected between the cap connecting portion and the opening connecting portion, wherein when the opening connecting portion and the cap connecting portion are connected to each other, the sealing ring is tightly pressed between the cap connecting part and the opening connecting portion, so that the water stored in the cavity of the bottle body is prevented from seeping through the position between the cap connecting portion and the opening connecting portion.

Another advantage of the present invention is to provide a water bottle for pet, wherein when the cap connecting portion and the opening connecting portion are connected to each other, and the water port of the fixing base is aligned with the opening of the bottle body, wherein the water access hoe of the displacement valve is aligned with the water port, the water stored in the cavity of the bottle body is allowed to pass through the opening, the water port, the water access hole and the water inlet and enter the flexible water bowl.

Another advantage of the present invention is to provide a water bottle for pet, wherein the flexible water bowl comprises a switch fixing portion disposed at the bottom thereof, wherein the switch unit comprises a water bowl connection portion matching with the switch fixing portion, wherein the water bowl connecting portion is adapted to be detachably connected with the switch fixing portion, wherein when the water bowl connecting portion and the switch fixing portion are connected to each other, the water port of the fixing seat is aligned with the water inlet of the flexible water bowl.

Another advantage of the present invention is to provide a water bottle for pet, wherein the flexible water bowl further comprises a switch accommodating portion surrounding the switch fixing portion, wherein when the water bowl connecting portion is connected to the switch fixing portion, the switch unit is accommodated in the switch accommodating portion to prevent dust and the like from contaminating the switch unit.

Another advantage of the present invention is to provide a water bottle for pet, wherein the switch unit comprises a sealing abutting cover, wherein the sealing abutting cover is buckled at the side of the fixing seat which is provided with the limiting walls, wherein when the water bowl connecting part and the switch fixing part are connected to each other, the sealing abutting cover is located between the fixing seat and the flexible water bowl to prevent water from seeping out.

Another advantage of the present invention is to provide a water bottle for pet, wherein the sealing abutment cover comprises a diverter head, and the diverter head is aligned with the water port of the fixing base, wherein the water bowl connecting portion is connected to the switch fixing portion, the diverter head enters the flexible water bowl through the water inlet of the flexible water bowl, so as to align the water access hole of the displacement valve with the water inlet of the flexible water bowl, the pet breeder squeezes the bottle body so that the water stored in the cavity of the bottle body passes through the opening, the water port, the water access hole, and the water inlet and enters the flexible water bowl through the diverter head, so as to avoid water waste caused by the water being sprayed out of the flexible water bowl when the pet keeper squeezes the bottle body too much.

Another advantage of the present invention is to provide a water bottle for pet, wherein the switch unit further comprises a water supply pipe, wherein one end of the water supply pipe is engaged with the water port of the fixing seat, and the other end of the water supply pipe enters the cavity through the opening of the bottle body, so that based on the length of the water supply pipe, it is convenient for the pet breeder to squeeze the bottle body when the water level of the cavity is relatively low, and the water in the cavity of the bottle body is fed into the flexible water bowl in a manner to improve the practicability of the water bottle for pet and prevent the waste of water resources.

Another advantage of the present invention is to provide a water bottle for pet, wherein the water supply pipe comprises a filter head, and the filter head is arranged at the end of the water supply pipe located in the cavity, so as to prevent the flexible water from entering the water supply pipe, so that the water entering the flexible water bowl is filtered to prevent the contaminated water or impurities in the water from entering the flexible water bowl, so as to ensure the quality and safety of drinking water for the pet.

Another advantage of the present invention is to provide a water bottle for pet, wherein the bottle body further comprises a strap, wherein the strap is being sleeved on the bottle body, and the trap comprises at least one harness buckle and a harness, wherein the length of the harness is allowed to be adjusted, wherein the harness is detachably attached to the harness buckle to enable the pet breeder to carry the water bottle for pet via the harness, and so as to further facilitate the carrying and transportation of the water bottle for pet.

Another advantage of the present invention is to provide a water bottle for pet, wherein the flexible water bowl, the switch unit and the bottle body are connected in a detachable manner, so as to facilitate the disassembly and cleaning of the water bottle for pet, and thus facilitating to maintain the hygienic condition of the water bottle for pet.

According to an aspect of the present invention, the present invention provides a water bottle for pet, comprising:

a flexible water bowl having a top opening and a water inlet provided at a bottom thereof;

a bottle body having a cavity and an opening communicating the cavity to the outside, wherein the cavity is adapted for being filled with water through the opening, wherein the bottle body is coupled to the flexible water bowl in such a manner that water is allowed to be fed into the flexible water bowl through the water inlet; and a switch unit arranged between the flexible water bowl and the bottle body, wherein the switch unit comprises a fixing seat and a displacement valve which is arranged to be capable of moving with respect to the fixing seat, wherein the fixing seat has a water port which is aligned with the water inlet of the flexible water bowl, the displacement valve has a water access hole and a water sealing member, wherein one of the water access hole and the water sealing member is selectively aligned with the water port by relative movement between the displacement valve and the fixing seat, wherein when the water access hole is aligned with the water port, the water port is communicated to the water inlet through the water access hole, and when the water sealing member is aligned with the water port, the water port is closed by the displacement valve.

According to an embodiment, the fixing base comprises two limiting walls which are arranged on a same side of the fixing base in a state of being parallel to each other, wherein a displacement channel is formed between the two limiting walls, wherein the water port is disposed in the displacement channel, and the displacement valve is arranged in the displacement channel to be displaced in a direction parallel to the limit walls, so as to be retracted into or rejected out of the displacement channel.

According to an embodiment, the switch unit comprises an elastic member, wherein an abutting wall is provided on the fixing seat at one end of the displacement channel, and one end of the elastic member is fixed on the abutting wall, the other end of the elastic member is biasing against the displacement valve, so as to push the displacement valve to pop out from the other end of the displacement channel.

According to an embodiment, the switch unit comprises a positioning rod which comprises a first connecting arm and a second connecting arm, wherein the first connecting arm of the positioning rod is connected to the fixing seat, and the second connecting arm of the positioning rod is connected to the displacement valve, so as to retain the displacement valve in the displacement channel.

According to an embodiment, the elastic member is a spring.

According to an embodiment, the water bottle for pet further comprises a guiding column provided on the abutting wall, wherein the guiding column is sleeved by the elastic member.

According to an embodiment, the displacement valve has a guiding cavity disposed at a side thereof facing towards the elastic member, wherein the other end of the elastic member is biasing against a cavity wall of the guiding cavity.

According to an embodiment, one of the limiting walls of the fixing base is formed with a rod retaining hole, and wherein the first connecting arm of the positioning rod is engaged with the rod retaining hole to connect the positioning rod to the fixing seat.

According to an embodiment, a side of the displacement valve facing the limiting wall which is connected to the positioning rod is provided with a rod displacement groove, wherein the second connecting arm of the positioning rod is engaged with the rod displacement groove, wherein when the displacement valve is displacing in the displacement channel, the second connecting arm moves in the rod displacement groove.

According to an embodiment, the rod displacement groove is provided with a guiding rod retaining buckle which comprises a buckle end, wherein the positioning rod is coupled with the rod displacement groove in such a manner that when displacement valve is retracted into the displacement channel, the second connecting arm is bucked and retained at the buckle end of the guiding rod retaining buckle, and when the displacement valve is ejected out through displacement channel, the second connecting arm is bucked and retained at an edge of the rod displacement groove.

According to an embodiment, the guiding rod retaining buckle comprises a guiding end having at least one inclined surface for guiding a movement path of the second connecting arm which moves in the rod displacement groove.

According to an embodiment, the displacement valve comprises a sealing sleeve member which is adapted to the aperture of the water access hole and the water sealing member, wherein the sealing sleeve member is arranged in a state of surrounding the water access hole and the water sealing member.

According to an embodiment, the bottle body comprises an opening connecting portion disposed near the opening and surrounding the opening, and the switch unit comprises a cap connecting portion which is matched with the opening connecting portion, wherein the cap connecting portion is detachably coupled to the opening connecting portion, so as to allow the opening to align with the water port.

According to an embodiment, the cap connecting portion is provided on a side of the fixing seat opposite to the side of the fixing seat on which the limiting walls are provided.

According to an embodiment, the opening connection portion and the cap connection portion are mutually mating threads.

According to an embodiment, the switch unit comprises a sealing ring disposed in an inner space of the cap connecting portion, wherein when the cap connecting portion and the opening connecting portion are connected to each other, the sealing ring is tightly pressed between the cap connecting portion and the opening connecting portion.

According to an embodiment, the flexible water bowl comprises a switch fixing portion provided at a bottom thereof, wherein the switch unit comprises a water bowl connecting portion matched with the switch fixing portion, wherein the water bowl connecting portion and the switch fixing portion are detachably connected to align the water port with the water inlet.

According to an embodiment, the flexible water bowl further comprises a switch accommodating portion surrounding the switch fixing portion, wherein when the water bowl connecting portion and the switch fixing portion are connected to each other, the switch unit is accommodated in the switch accommodating portion.

According to an embodiment, the switch fixing portion and the water bowl connecting portion are detachably connected in a snap-fit manner.

According to an embodiment, the switch unit comprises a sealing abutting cover which is buckled on the side of the fixing seat provided with the limiting walls.

According to an embodiment, the sealing abutment cap comprises a diverter head aligned with the water port of the fixing seat, wherein when the water bowl connecting portion is connected to the switch fixing portion, the diverter head enters the flexible water bowl through the water inlet of the flexible water bowl.

According to an embodiment, the top opening of the flexible water bowl is configured in an inclined state.

According to an embodiment, the switch unit further comprises a water supply pipe, wherein one end of the water supply pipe is engaged with the water port of the fixing seat, and the other end of the water supply pipe is inserted into the cavity through the opening of the bottle body.

According to an embodiment, the water supply pipe comprises a filter head disposed on the other end of the water supply pipe located in the cavity.

According to an embodiment, the bottle body further comprises a strap which is sleeved on the bottle body, wherein the strap comprises at least a harness buckle and a harness, wherein a length of the harness is capable of being adjusted, wherein the harness is detachably connected to the harness buckle.

Still further objects and advantages will become apparent from a consideration of the ensuing description and drawings.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

It is understandable that the term "a" or "an" should be understood as "at least one" or "one or more". In other words, in some embodiments, the number of an element can be one and in other embodiment the number of the element can be more than one. The term "a" or "an" is not construed as a limitation of quantity.

In the description of the present invention, it should be noted that the terms "assemble, "connect" and "couple" should be understood in a broad sense, unless otherwise expressly specified and limited, for example, it may be a fixed connection, a detachable connection, or an integral connection; it can be a mechanical connection, an electrical connection or can communicate with each other; it can be directly connected or indirectly connected through an intermediate medium, it can be the internal communication of two elements or the interaction of two elements. For those of ordinary skill in the art, the specific meanings of the above terms in the present invention can be understood according to specific situations.

Figure 1:
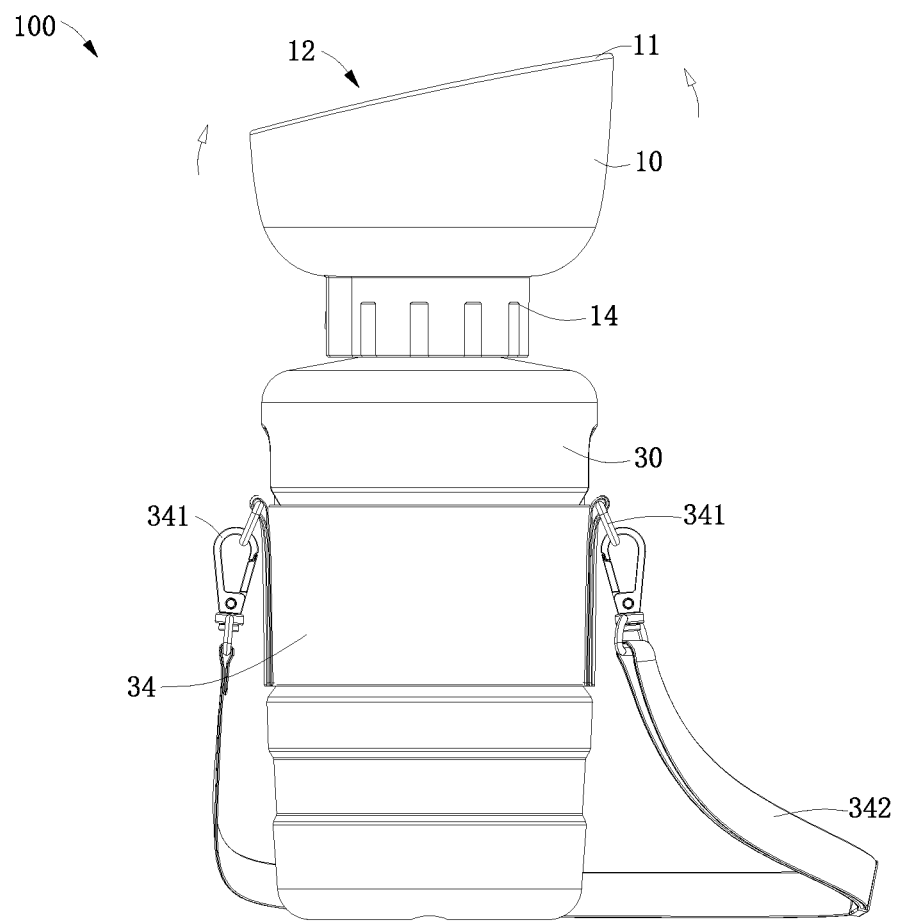
FIG. 1 is a perspective view of a water bottle for pet being in a unfolded state according a preferred embodiment of the present invention.
Figure 2:
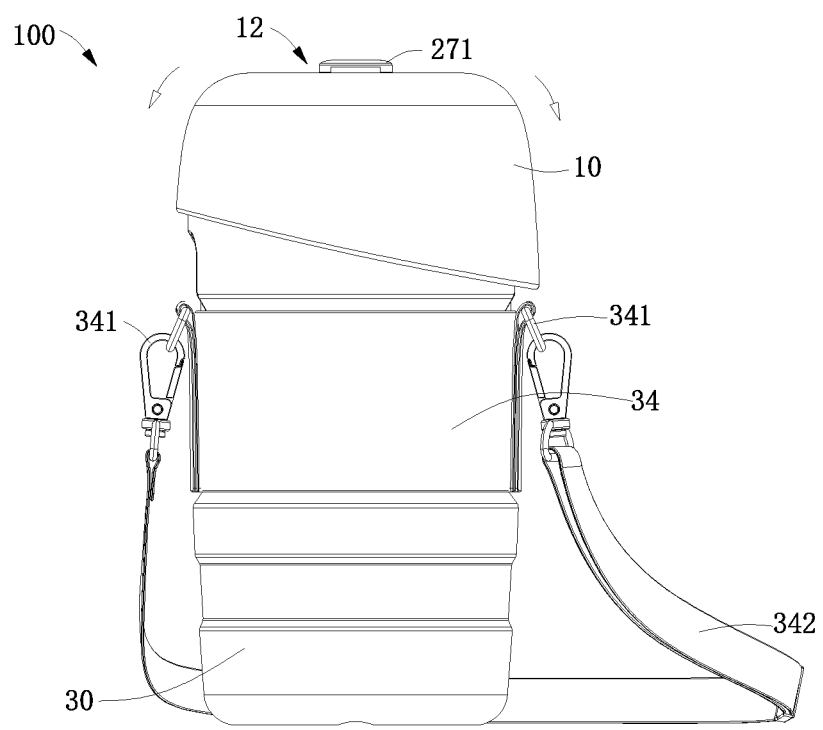
FIG. 2 is a perspective view of the water bottle for pet being in a flipped state according the above preferred embodiment of the present invention.
Figure 3:
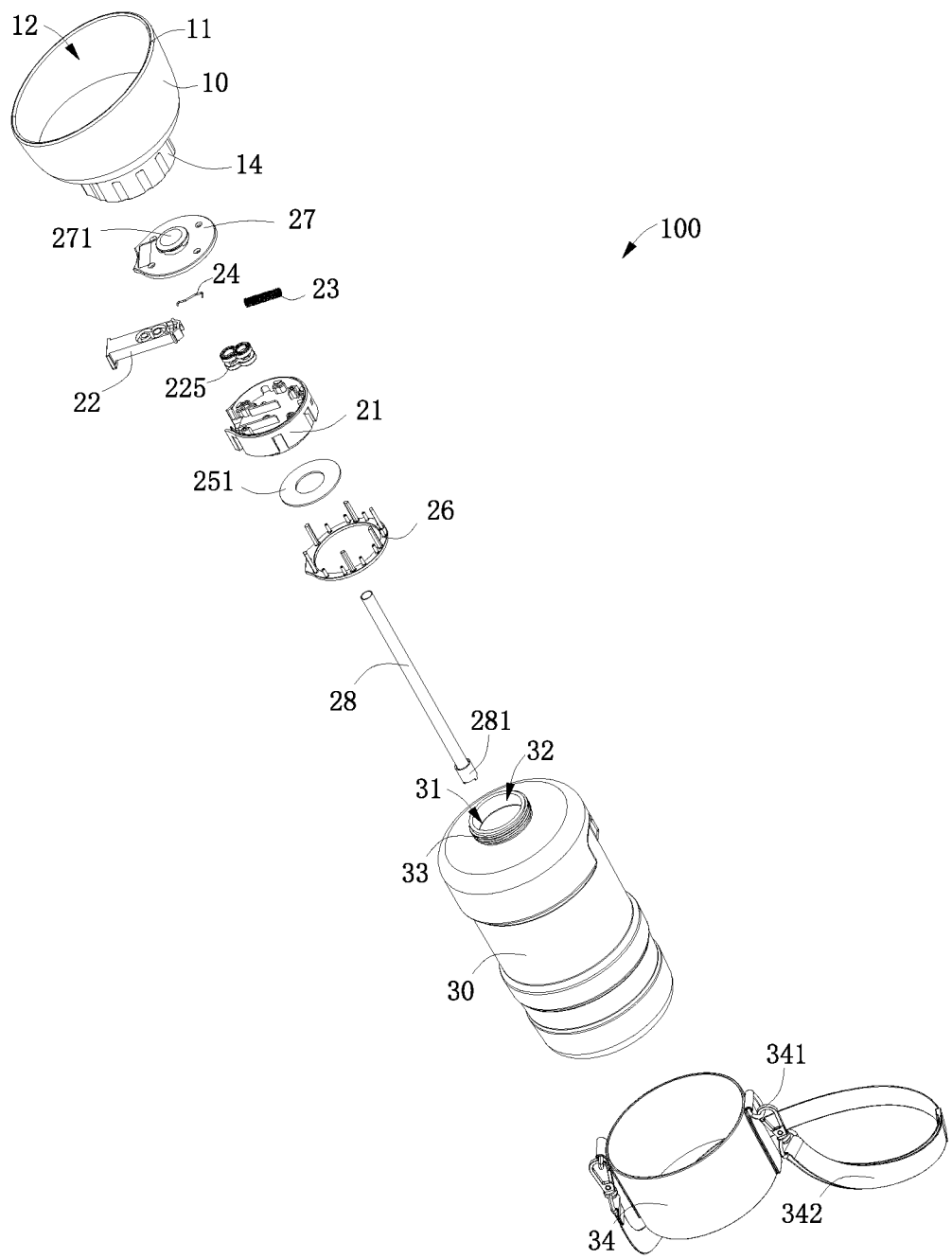
FIG. 3 is an exploded view of the water bottle for pet according the above preferred embodiment of the present invention.
Figure 4:
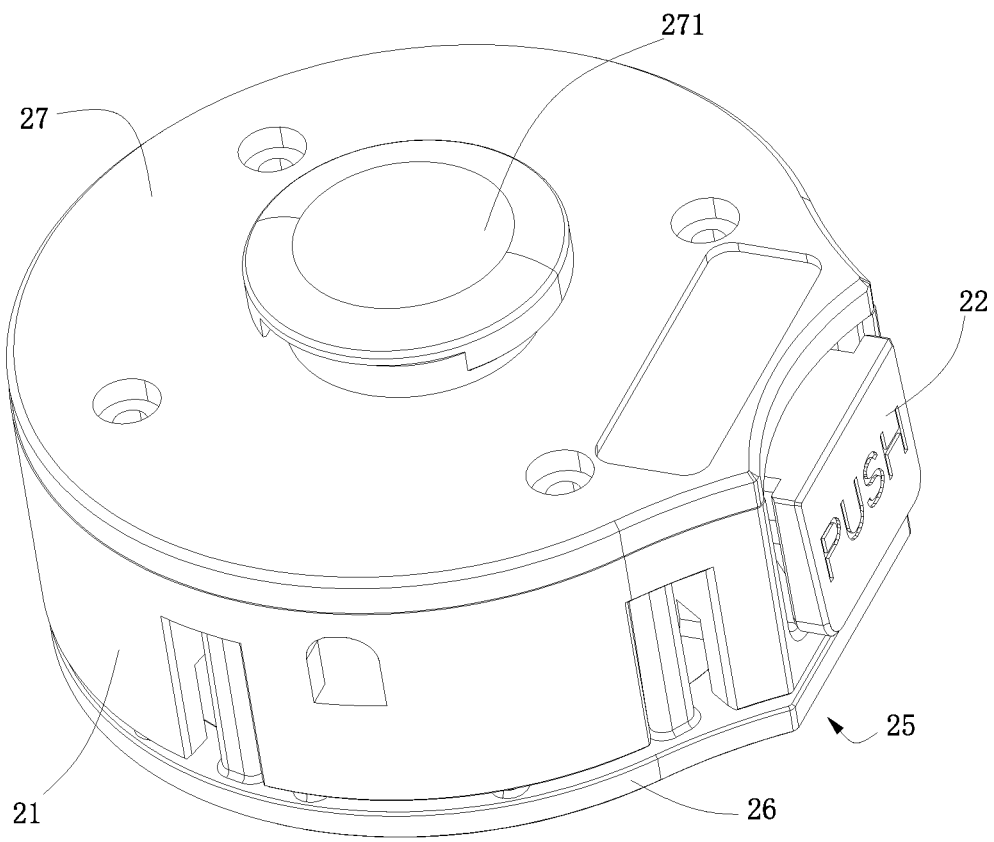
FIG. 4 is a schematic view illustrating a switch unit of the water bottle for pet according the above preferred embodiment of the present invention.
Figure 5:
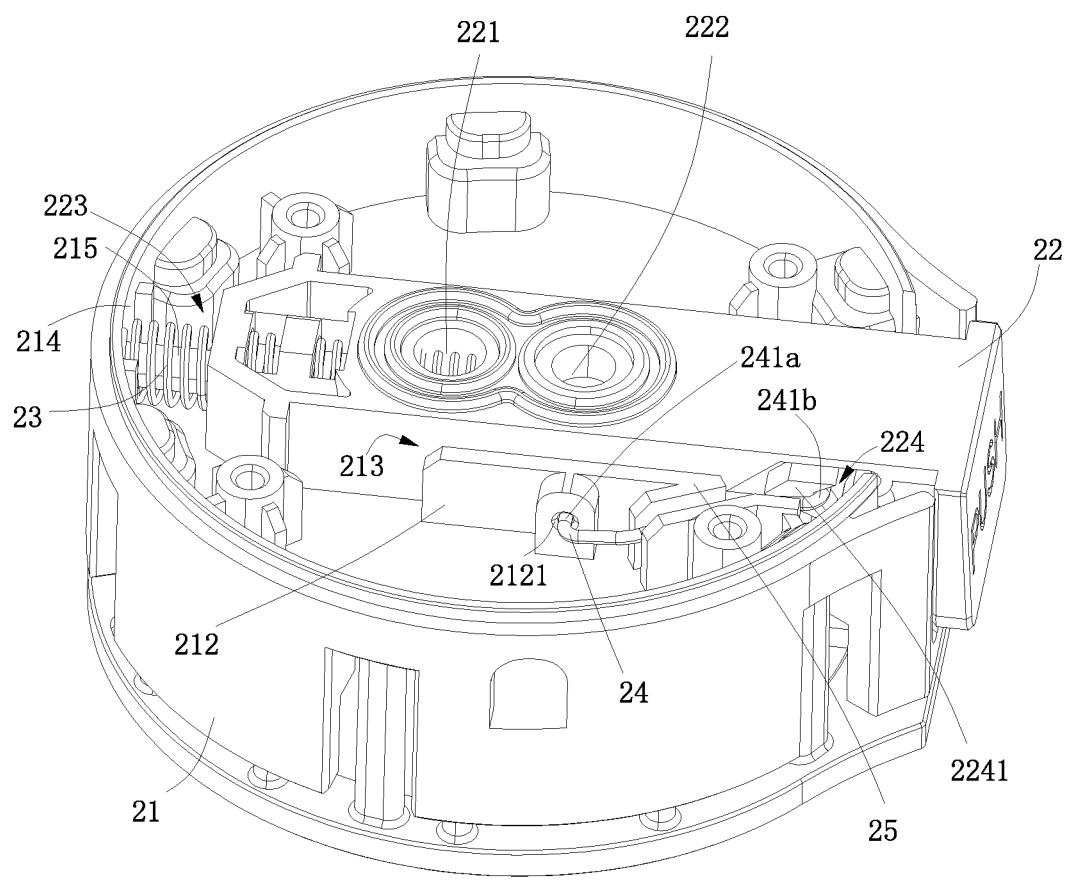
FIG. 5 is another schematic view illustrating the switch unit of the water bottle for pet according the above preferred embodiment of the present invention.
Figure 6:
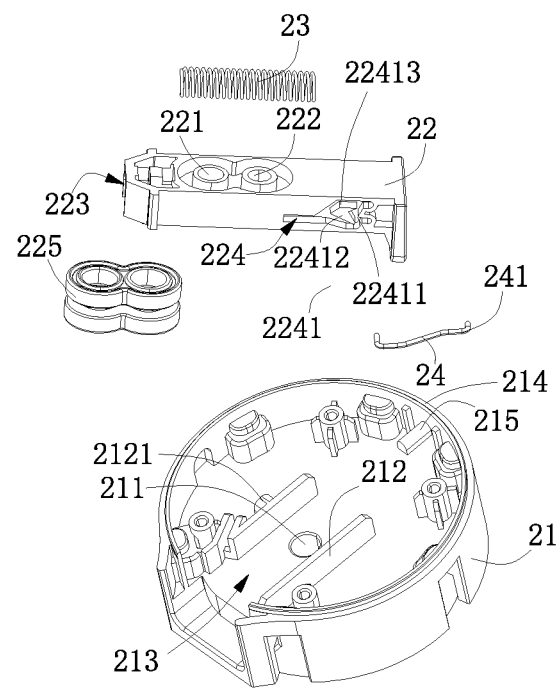
FIG. 6 is an exploded view illustrating the switch unit of the water bottle for pet according the above preferred embodiment of the present invention.
Figure 7:
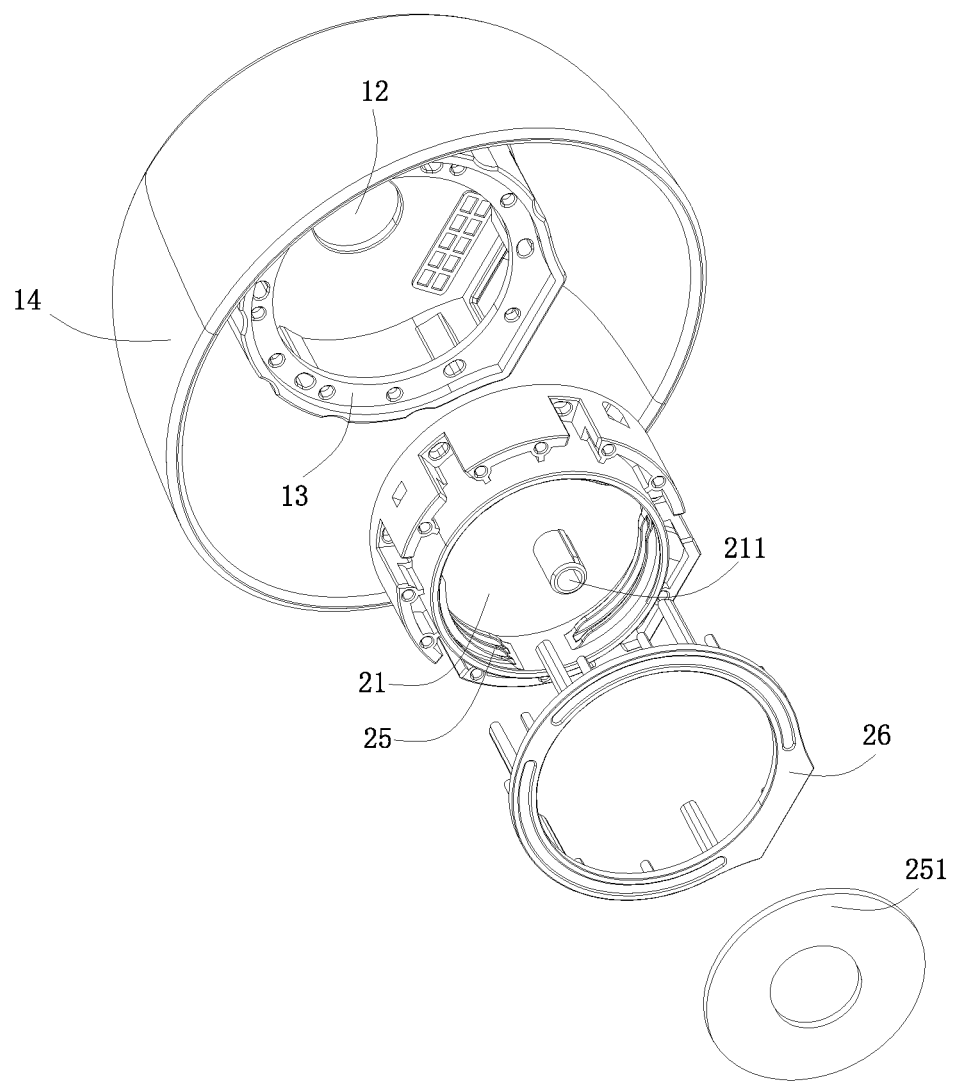
FIG. 7 is an exploded view illustrating the switch unit and the flexible water bowl of the water bottle for pet according the above preferred embodiment of the present invention.
Figure 8:
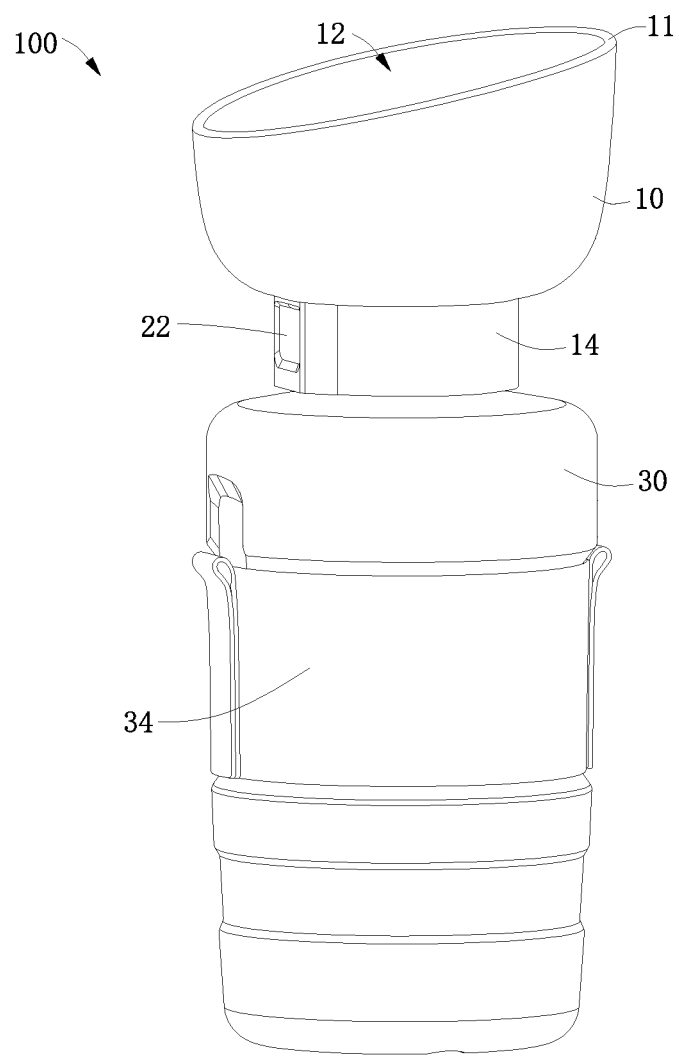
FIG. 8 is another perspective view of the water bottle for pet being in the unfolded state according the above preferred embodiment of the present invention.
Figure 9:
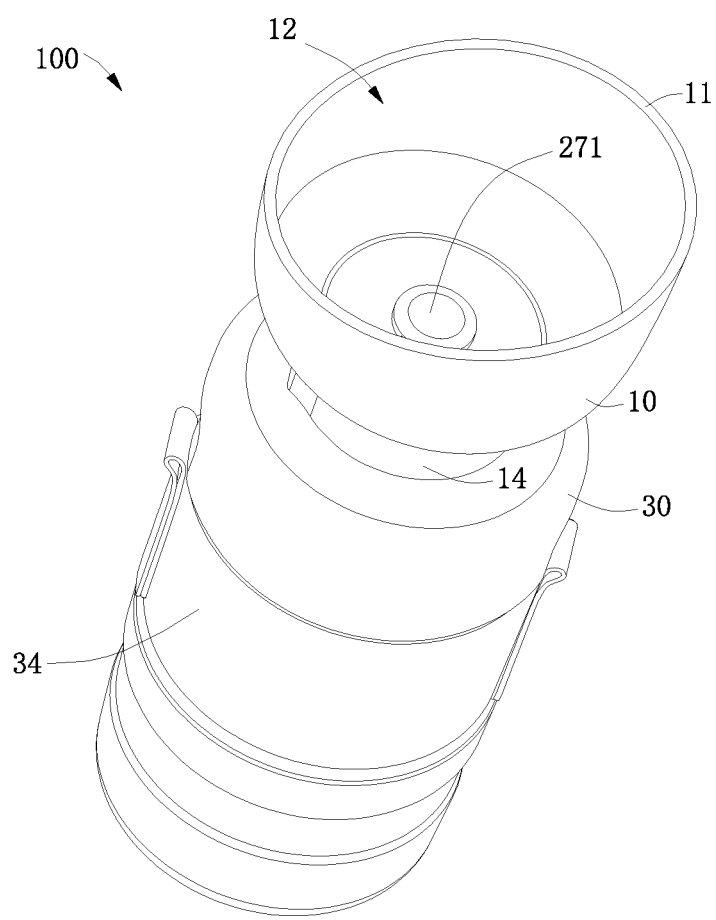
FIG. 9 is another perspective view of the water bottle for pet being in the unfolded state according the above preferred embodiment of the present invention.
Figure 10:
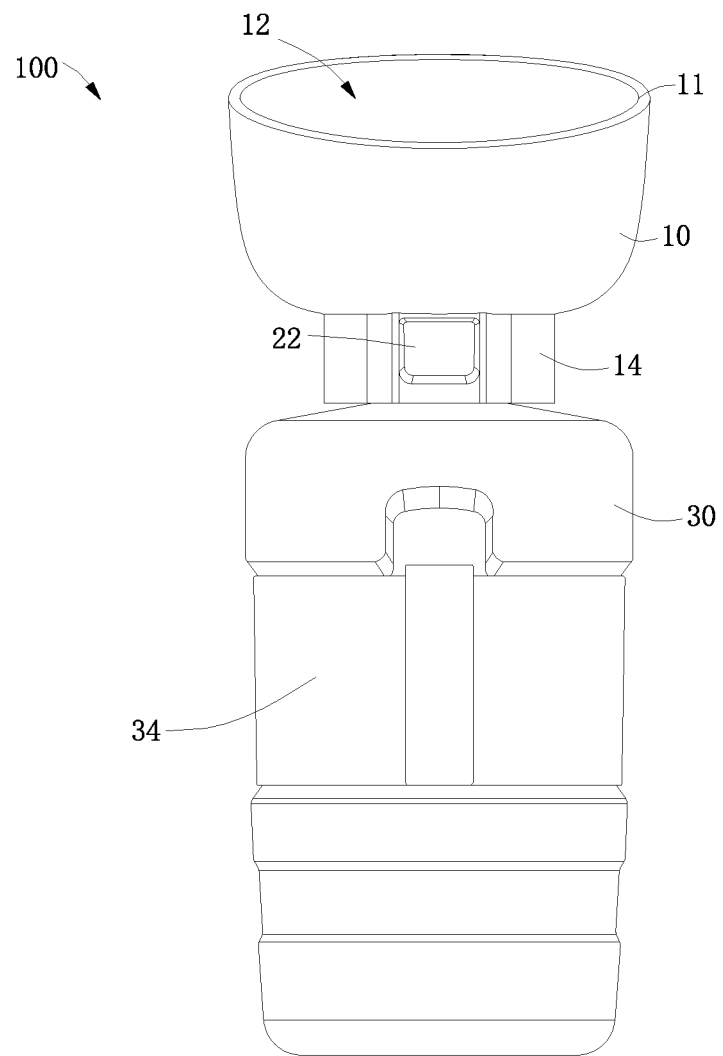
FIG. 10 is a front plan view of the water bottle for pet according the above preferred embodiment of the present invention.
Figure 11:
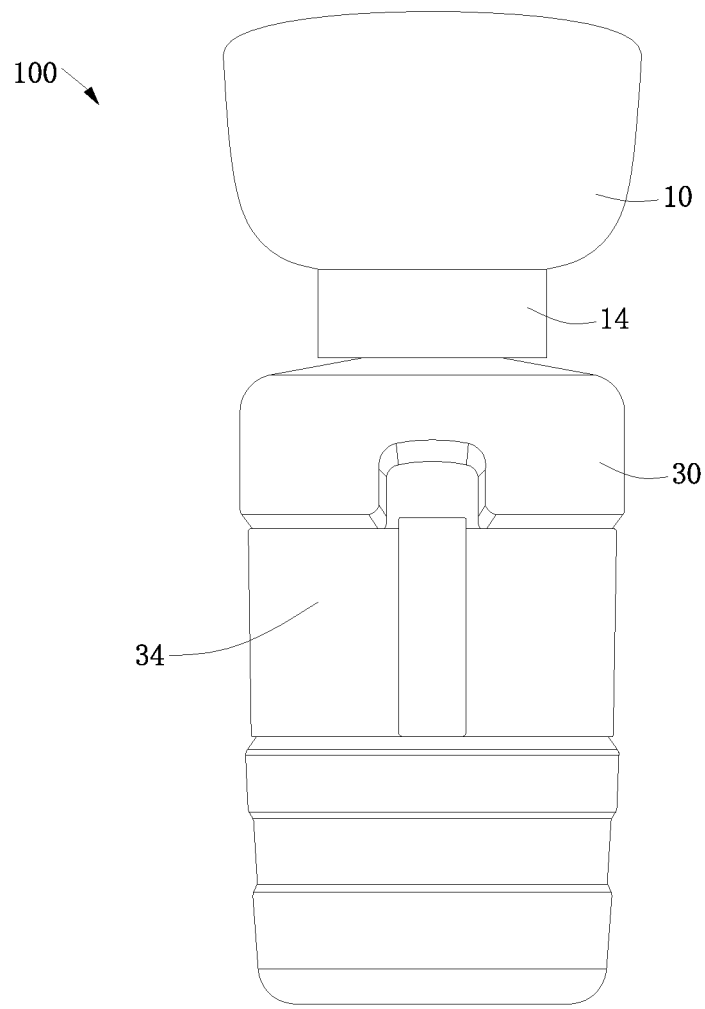
FIG. 11 is a rear plan view of the water bottle for pet according the above preferred embodiment of the present invention.
Figure 12:
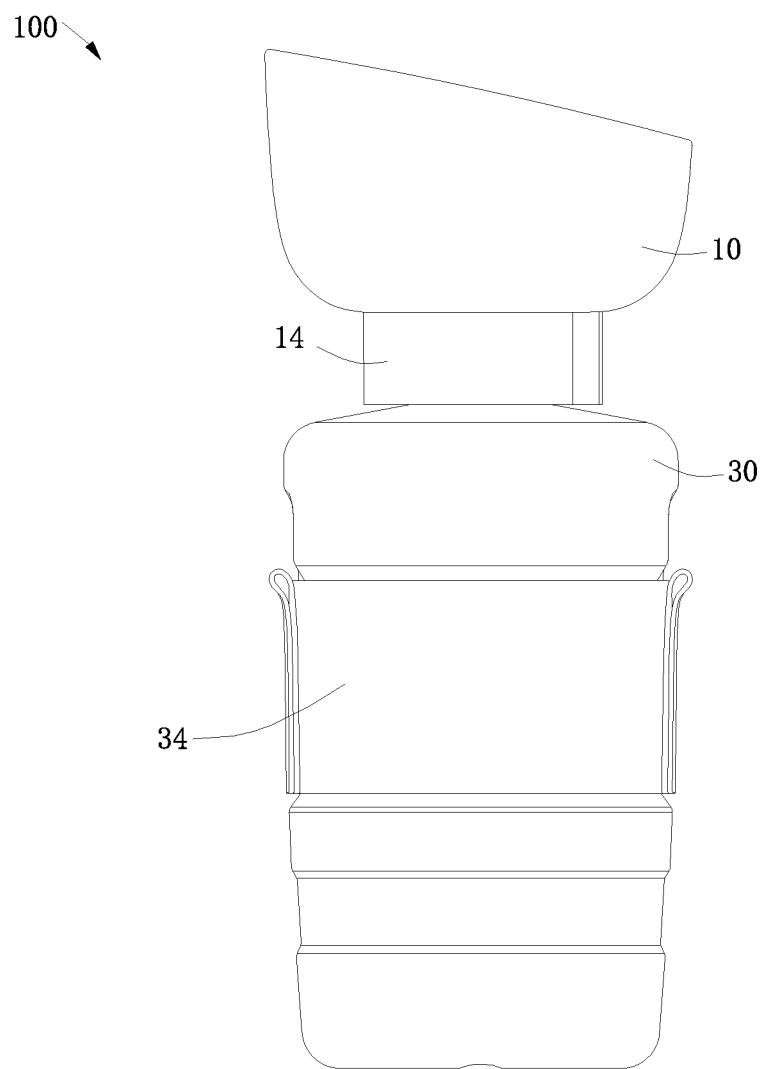
FIG. 12 is a left plan view of the water bottle for pet according the above preferred embodiment of the present invention.
Figure 13:
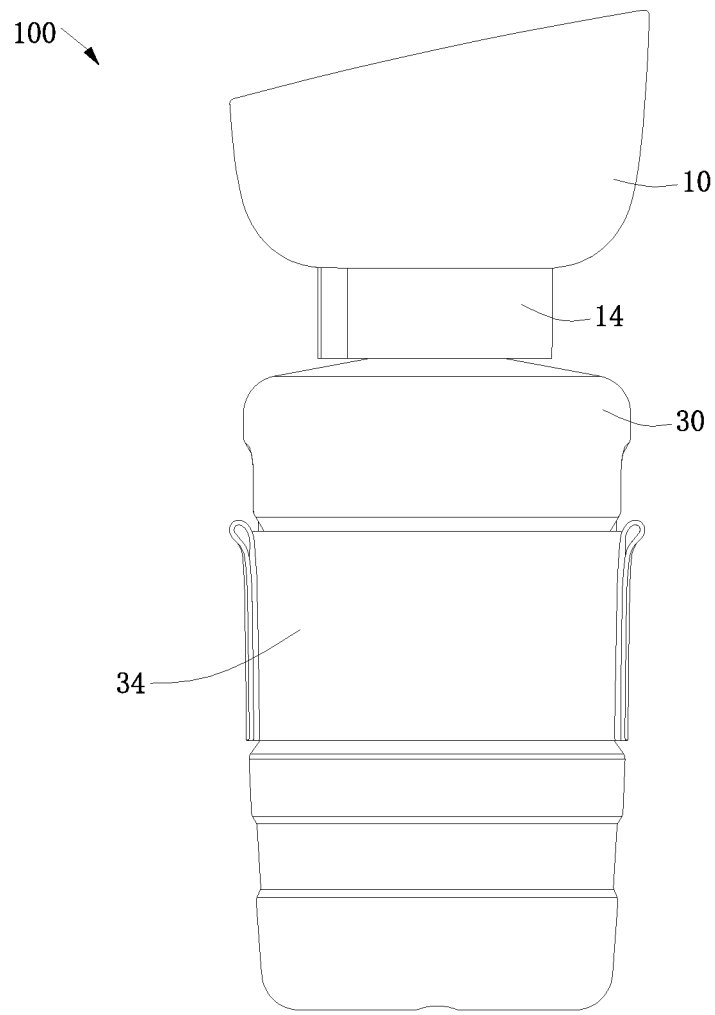
FIG. 13 is a right plan view of the water bottle for pet according the above preferred embodiment of the present invention.
Figure 14:
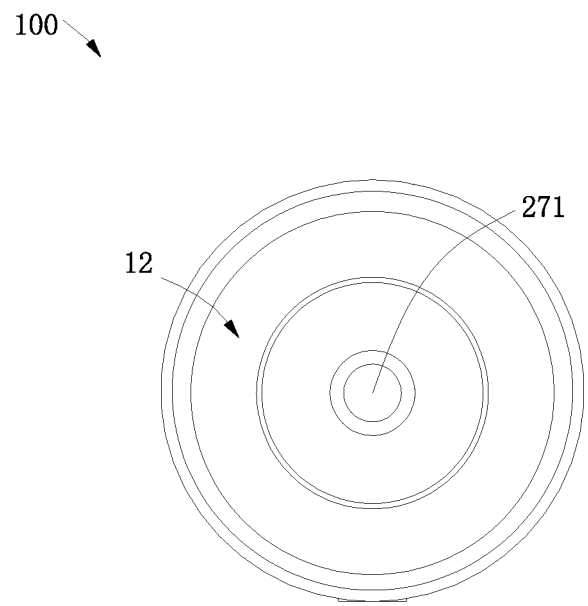
FIG. 14 is a top plan view of the water bottle for pet according the above preferred embodiment of the present invention.
Figure 15:
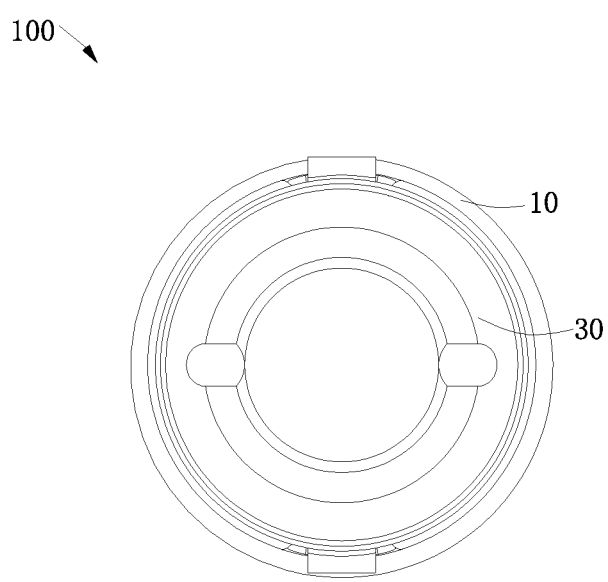
FIG. 15 is a bottom plan view of the water bottle for pet according the above preferred embodiment of the present invention.

Referring to FIG. 1 to FIG. 15 of the drawings, a water bottle 100 for pet according to a preferred embodiment is illustrated, the water bottle 100 for pet comprises a flexible water bowl 10, a switch unit 20 and a bottle body 30 which is coupled to the flexible water bowl 10 to allow the bottle body 30 to supply water stored therein to the flexible water bowl 10, wherein the switch unit 20 is disposed between the bottle body 30 and the flexible water bowl 10 to control on and off of water supply between the bottle body 30 and the flexible water bowl 10.

More specifically, the flexible water bowl 10 has a top opening 11 and a water inlet 12 at a bottom thereof, wherein the bottle body 30 allows water to be supplied and fed into the flexible water bowl 10 through the water inlet 12. Accordingly, a pet breeder can avoid direct contact with the water stored in the bottle body 30 during the process of supplying and feeding the water stored in the bottle body 30 into the flexible water bowl 10, so as to reduce the health risks of the pet and the pet breeder.

Furthermore, the bottle body 30 has a cavity 31 and an opening 32 communicating the cavity 31 to outside, so that the cavity 31 of the bottle 30 can be filled with drinking water of the pet through the opening 32, and the cavity 31 can be cleaned through the opening 32, so as to maintain the hygienic state of the water bottle 100 for pet.

Particularly, the flexible water bowl 10 is made of elastic material, such as but not limited to rubber material, flexible plastic, etc., wherein the flexible water bowl 10 is made of elastic material and can be selectively flipped and unfolded, so that the volume of the water bottle 100 for pet can be reduced through the folding of the flexible water bowl 10, and thus the water bottle 100 for pet becomes more compact, so as to facilitate the carrying and transportation of the water bottle 100 for pet, thereby rendering a good using experience for the pet breeder.

It is worth mentioning that the top opening 11 of the flexible water bowl 10 is designed and configured in an inclined state, so that the depth and shape of the flexible water bowl 10 can be adapted to the drinking habit of the pet, and it is convenient for the pet to drink the water in the flexible water bowl 10, for example, it enables the pet such as a dog to conveniently drink the water contained in the flexible water bowl 10 by licking, thereby reducing the waste of water resources, and allows the pet breeder to hold the bottle body 10 during the water feeding process to achieve water feeding to the pet, and the pet breeder will not have direct contact with the pet's saliva change during the water feeding process, so as to not only facilitate the use of the water bottle for pet by the pet breeder, but also ensure hygiene during use.

In particular, the switch unit 20 is disposed between the flexible water bowl 10 and the bottle body 30, so as to prevent the pet breeder to have direct and indirect contact with the water stored in the bottle body 30 during the operation of the water bottle 100 for pet by the pet breeder, such as avoiding direct contact with the water during the process of feeding water into the flexible water bowl 10, or preventing indirect contact with the water resulted from touching the flexible water bowl 10 during the opening and closing process of the switch unit 20, so as to reduce health risks to the pet and the pet breeder.

More specifically, the switch unit 20 comprises a fixing seat 21 and a displacement valve 22, wherein the fixing seat 21 has a water port 211, wherein the switch unit 20 is arranged between the flexible water bowl 10 and the bottle body 30, the water port 211 of the fixing seat 21 is aligned with the water inlet 12 of the flexible water bowl 10. The displacement valve 22 has a water access hole 221 and a water sealing member 222, the displacement valve 22 is set to be able to displace on the fixing seat 21 to selectively align one of the water access hole 221 and the water sealing member 222 with the water port 211, so as to control on and off of water supply from the water port 211. The water sealing member 222 can be embodied as a sealing surface or an indented groove which does not penetrate through the displacement valve 22. Specifically, when the water access hole 221 is aligned with the water port 211, the water port 211 is in an open state that is able to supply water, when the water sealing member 222 is aligned with the water port 211, the water port 211 is in a closed state, so that the displacement of the displacement valve 22 on the fixing seat 21 can be freely adjusted to allow or prohibit the water supply from the bottle body 30 to the flexible water bowl 10, so as to realize the control of the water delivery by the pet breeder.

Furthermore, the displacement valve 22 comprises a sealing sleeve member 225 which is adapted to the aperture of the water access hole 221 and the water sealing member 222, and the sealing sleeve member 225 is arranged in a state of surrounding the water access hole 221 and the water sealing member 222 to prevent the water from seeping out and avoid the waste of water resources.

It is worth mentioning that the water bottle 100 for pet controls its water delivery based on the displacement of the displacement valve 22, so that the pet breeder can achieve the displacement by applying a displacement force to the displacement valve 22. The displacement of the displacement valve 22 is used to control the water delivery, so that the operation of the water bottle 100 for pet can be easily realized, and the direct or indirect contact with the water during the operation is avoided, and the user is provided with a good use experience, so as to ensure the health of the pet and the pet breeder.

In particular, the water access hole 221 or the water sealing member 222 of the displacement valve 22 is selectively aligned with the water port 211 by changing the relative position between the displacement valve 22 and the fixing seat 21 by moving the displacement valve 22. It can be understood that there are various ways to achieve the displacement of the displacement valve 22 on the fixing seat 21, such as the displacement valve 22 can be displaced on the fixing seat 21 by means of swinging the displacement valve 22, rotating the displacement valve 22, and pulling the displacement valve 22. Alternatively, in some embodiments of the present invention, the displacement valve 22 is fixed, and the relative position between the fixing seat 21 and the displacement valve 22 can be changed by moving the fixing seat 21, so as to selectively align the access hole 221 or the water sealing member 222 of the displacement valve 22 with the water port 211, the manner for achieving the change of the relative position is not limited in the present invention.

Preferably, in this embodiment of the present invention, the relative position between the displacement valve 22 and the fixing seat 21 is preferably changed in the manner of linear displacement of the displacement valve 22 on the fixing seat 22, so as to accurately align the water access hole 221 or the water sealing member 222 with the water port 211, the effectiveness of the water delivery control by the pet breeder is realized, and it is convenient for the pet breeder to control the operation of the switch unit 20, and it is simple and easy to realize the control of water delivery.

More specifically, the fixing seat 21 comprises two mutually parallel limiting walls 212 disposed on the same side thereof, and a displacement channel 213 is formed between the two limiting walls 212, wherein the water port 211 is located in the displacement channel 213, wherein the displacement valve 22 is disposed in the displacement channel 213 in a manner that it can be displaced in a direction parallel to the limiting wall 212, thereby achieving the states aligning the water access hole 221 or the water sealing member 222 with the water port 211, so as to realize the change of the relative position between the displacement valve 22 and the fixing seat 21 in the way of linear displacement of the displacement valve 22 on the fixing seat 22, so that the water access hole 221 or the water sealing member 222 can be precisely aligned with the water port 211, and thus the pet breeder can freely allow or prohibit the water in the bottle body 30 from entering the flexible water bowl 10, and direct or indirect contact with water during operation is avoided.

Furthermore, the displacement valve 22 can be ejected out or retracted into the displacement channel 213. When the displacement valve 22 is retracted into the displacement channel 213, one of the water access hole 221 and the water sealing member 222 is aligned with the water port 211. When the displacement valve 22 is in a state where the displacement valve 22 is ejected out from the displacement channel 213, the other one of the water access hole 221 and the water sealing member 222 is aligned with the water port 211, so as to form the conduction to the water port 211 or close the conduction to the water port 211.

It is worth mentioning that the displacement valve 22 can be quickly ejected from the displacement channel 213, so that the operation of the switch unit 20 by the pet breeder is more labor-saving, and the displacement of the displacement valve 22 which is retracted into or ejected out of the displacement channel 213 can be utilized to precisely align one of the water access hole 221 and the water sealing member 222 with the water port 211, so as to realize the effective control of water delivery by the pet breeder.

Specifically, the switch unit 20 comprises an elastic member 23, an abutting wall 214 is provided on the fixing base 21 at one end of the displacement channel 213, and one end of the elastic member 23 is fixed to the abutting wall 214, the other end of the elastic member 23 is biasing against the displacement valve 22 for urging the displacement valve 22 to pop up from the other end of the displacement channel 213. Specifically, when the displacement valve 22 is retracted and received in the displacement channel 213, the elastic member 23 is compressed and can push the displacement valve 22 to urge the displacement valve 20 to be in a state tend to pop up from the displacement channel 213, so that the displacement valve 22 can be pop up quickly from the displacement channel 213 to reset its position, and thus the pet breeder can move the displacement valve 22 with less effort to align one of the water access hole 221 or the water sealing member 222 of the displacement valve 22 with the water port 211.

Furthermore, the switch unit 20 comprises a positioning rod 24 which comprises two connecting arms 241 extended from both ends thereof in a same radial direction, wherein a first connecting arm 241a of the positioning rod 24 is connected to the fixing seat 21, and a second connecting arm 241b of the positioning rod 24 is connected to the displacement valve 22 to retain the displacement valve 22 in the displacement channel 213. Specifically, based on the design and selection of the length of the positioning rod 24, the positioning rod 24 is connected to the fixing seat 21 and the displacement valve 22 for pulling the displacement valve 22, so as to precisely align the water access hole 221 or the water sealing member 222 of the displacement valve 22 with the water port 211, and prevent the displacement valve 22 from falling off the displacement channel 213, so as to ensure the safety of the switch unit 20, as well as the working stability and structural stability of the switch unit 20.

More specifically, one of the limiting walls 212 of the fixing seat 21 is provided with a rod retaining hole 2121, wherein one of the connecting arms 241 of the positioning rod 24 is buckled to the rod retaining hole 2121. Specifically, in this embodiment of the present invention, the positioning rod 24 is connected to the fixing seat 21 in a state in which one of the connecting arms 241, which is the first connecting arm 241a, passes through the rod retaining hole 2121, wherein the side of the displacement valve 22 facing the limit wall 212 connected to the positioning rod 24 is provided with a rod displacement groove 224, wherein in the state of the displacement valve 22 being displaced in the displacement channel 213, the second connecting arm 241b of the positioning rod 24 moves in the rod displacement groove 224, wherein the rod displacement groove 224 is provided with a guiding rod retaining buckle 2241 which has a buckle end 22411. When the displacement valve 22 is retracted and received in the displacement channel 213, the second connecting arm 241b is snap-fitted to the buckle end 22411 of the guiding rod retaining buckle 2241, so as to retain the displacement valve 22 in position and prevent the displacement valve 22 from being pushed by the elastic member 23 to move. In particular, in the state of the second connecting arm 241b is retained at the buckle end 22411 of the guiding rod retaining buckle 2241, the elastic member 23 is in a compressed state, and the displacement valve 22 cannot be restored due to the pulling of the positioning rod 24, so that the displacement valve 22 is received in the displacement channel. 213 and is maintained in that state. When the displacement valve 22 is subjected to an external force, the second connecting arm 241b of the positioning rod 24 is separated from the buckle end 22411 of the guiding rod retaining buckle 2241, the elastic member 23 restores its shape and pushes the displacement valve 22 to protrude from the displacement channel 213, thereby forming a state in which the displacement valve 22 pops up from the displacement channel 213. In the state in which the displacement valve 2 is ejected out from the displacement channel 213, the second connecting arm 241b of the positioning rod 24 is buckled to an edge 22413 of the rod displacement groove 224 to prevent the displacement valve 22 from falling off the displacement channel 213 and ensure the operational stability and structural stability of the switch unit 20.

Particularly, the guiding rod retaining buckle 2241 further has a guiding end 22412, wherein the guiding end 22412 of the guiding fixing rod buckle 2241 is used to guide the movement path of the second connecting arm 241b of the positioning rod 24 in the rod displacement groove 224. In other words, when the displacement valve 22 is forced to move to drive the second connecting arm 241b of the positioning rod 24 to move in the rod displacement groove 224, the second connecting arm 241b of the positioning rod 24 can be guided to be buckled to the buckle end 22411 of the guiding rod retaining buckle 2241, or the second connecting arm 241b of the positioning rod 24 can be guided to be buckled to the edge 22413 of the displacement groove 224 to respectively form a state in which the displacement valve 22 is received in the displacement channel 213 and a state in which the displacement valve 22 is ejected and popped up from the displacement channel 231. As an example, on the premise that the displacement valve 22 is in the state of being popped up from the displacement channel 231, the pet breeder can apply a force to the displacement valve 22, specifically, the pet breeder can push the displacement valve 22 to displace toward the abutting wall 214 of the fixing wall 21, thereby resulting in the displacement of the second connecting arm 241b in the rod displacement groove 224, wherein the guiding end 22412 of the guiding rod retaining buckle 2241 has at least one inclined surface, and the second connecting arm 241b biases against the inclined surface of the guiding end 22412 and moves along the inclined surface of the guiding end 22412 during the displacement of the second connecting arm 241b until it reaches to the buckle end 22411 of the guiding rod retaining buckle 2241, so as to be buckled to the buckle end 22411 to form a state in which the displacement valve 22 is received in the displacement channel 213. By applying a force to the displacement valve 22, specifically applying a force to the displacement valve 22 in the direction away from the abutting wall 214 of the fixing seat 21, the second connecting arm 241b is separated from the buckle end 22411 of the guiding rod retaining buckle 2241, the elastic member 23 restores its shape and pushes the displacement valve 22 to protrude from the displacement channel 213, and to drive the second connecting arm 241b to displace in the rod displacement groove 224, wherein the second connecting arm 241b is displaced along the guiding end 22412 of the guiding rod retaining buckle 2241, so as to be guided and buckled to the edge 22413 of the rod displacement groove 224.

It is worth mentioning that in order to further improve the accuracy of the displacement direction of the displacement valve 22 in the displacement channel 213, so as to ensure that the water access hole 221 or the water sealing member 222 can be accurately aligned with the water port 211, in this embodiment of the present invention, the abutting wall 214 is provided with a guiding column 215, wherein the guiding column 215 is sleeved by the elastic member 23 to fix and guide the movement of the elastic member 23, and to avoid the unwanted deformation of the elastic member 23 during the compression of the elastic member 23, so as to ensure the structural stability of the switch unit 20. In addition, based on the fixing and guiding of the elastic member 23 by the guiding column 215, the probability of unwanted deformation of the elastic member 23 during the compression process is greatly reduced, thus ensuring that the direction of the pushing force generated when the elastic member 23 is restored is consistent, thereby ensuring that when the elastic member 23 is restored, the pushing force applied to the displacement valve 22 is consistent, so as to improve the accuracy of the displacement direction of the displacement valve 22 in the displacement channel 213.

In particular, the side of the displacement valve 22 facing the elastic member 23 is provided with a guiding cavity 223, wherein the other end of the elastic member 23 is abutted against a cavity wall of the guiding cavity 223, so as to guide the movement direction in which the elastic member 23 pushes the displacement valve 22 to displace, so as to ensure that the displacement valve 22 can be displaced in the displacement channel 213 in a direction parallel to the limiting walls 212, and thus the accuracy of the displacement direction of the displacement valve 22 in the displacement channel 213 is further improved to ensure that the water access hole 221 or the water sealing member 222 can be accurately aligned with the water port 211.

Furthermore, the bottle body 30 is coupled to the flexible water bowl 10 via the switch unit 20, wherein the opening 32 of the bottle body 30 is disposed with an opening connecting portion 33 near and surrounding the opening 32, the switch unit 20 comprises a cap connecting portion 25 matched with the opening connecting portion 33, wherein the cap connecting portion 25 is suitable for being detachably connected with the opening connecting portion 33, so as to facilitate the cleaning of the water bottle 100 for pet and maintain the hygienic state of the water bottle 100 for pet.

In particular, the cap connecting portion 25 is disposed on a side opposite to the side of the fixing base 21 where the limiting walls 212 are disposed, wherein when the cap connecting portion 25 and the opening connecting parts 33 are connected to each other, the water port 211 of the fixing seat 21 is aligned with the opening 32 of the bottle body 30, so that the water access hole 221 of the displacement valve 22 is aligned with the water port 211, the water stored in the cavity 31 of the bottle body 30 is allowed to pass through the opening 32, the water port 211, the water access hole 21 and the water inlet 12 and reach the flexible water bowl 10.

It is worth mentioning that in this embodiment of the present invention, the cap connecting portion 25 and the opening connecting portion 33 are embodied as threads that match with each other, so that the detachable connection between the cap connecting portion 25 and the opening connecting portion 33 can be easily realized, and excellent air tightness can also be achieved, so as to prevent the water stored in the cavity 31 of the bottle body 30 from seeping out. It can be understood that in some embodiments of the present invention, the cap connecting portion 25 and the opening connecting portion 33 may also be coupled with each other by other detachable connecting structures, such as mutually engaging airtight elements and mutually magnetically attracting magnetic elements.

Particularly, the switch unit 20 further comprises a sealing ring 251 which is arranged in the inner space of the cap connecting portion 25, so that when the cap connecting portion 25 and the opening connecting part 33 is in the state of being connected to each other, the sealing ring 251 is tightly pressed between the cap connecting portion 25 and the opening connecting part 33, so as to further strengthen the airtightness between the cap connecting portion 25 and the opening connecting part 33, so as to prevent the water stored in the cavity 31 of the bottle body 30 from seeping out through the position between the cap connecting portion 25 and the opening connecting part 33.

Furthermore, the flexible water bowl 10 comprises a switch fixing portion 13 disposed at the bottom thereof, wherein the switch unit 10 comprises a water bowl connecting portion 26 which is matched with the switch fixing portion 13, wherein the water bowl connecting portion 26 is adapted to be detachably connected to the switch fixing portion 13, wherein in the state where the water bowl connecting portion 26 and the switch fixing portion 13 are connected to each other, the water port 211 of the fixing seat 21 is aligned with the water inlet 12 of the flexible water bowl 10, so that when the water access hole 21 of the displacement valve 22 is in the displacement channel 213 to align the water access hole 221 of the displacement valve 22 with the water port 211, the opening 32, the water port 211, the water access hole 221 and the water inlet 12 are aligned with each other.

Particularly, the flexible water bowl 10 further comprises a switch accommodating portion 14 surrounding the switch fixing portion 13, wherein in the state where the water bowl connecting portion 26 and the switch fixing portion 13 are connected to each other, the switch unit 20 is accommodated in the switch accommodating portion 14 to prevent dust and the like from polluting the switch unit 20, especially to prevent dust and the like from passing through the water bowl connecting portion 26 and the switch fixing portion 13 into the water bottle 100 for pet to cause pollution to the water.

It is worth mentioning that in this embodiment of the present invention, the switch fixing portion 13 and the water bowl connecting portion 26 are detachably connected in a snap-fit manner, so that the detachable connection between the switch fixing part 13 and the water bowl connecting part 26 is convenient for the pet breeder to disassemble and clean the water bottle 100 for pet. It is also understandable that in some embodiments of the present invention, the switch fixing portion 13 and the water bowl connecting portion 26 can also be configured as detachable connecting structures such as mutually matched threads, mutually matched screws and screw holes, and mutually magnetically attracting magnetic elements.

In particular, the switch unit 20 comprises a sealing abutting cover 27 which is buckled on the side of the fixing seat 21 where the limiting walls 212 are provided, so that when the water bowl connecting portion 26 and the switch fixing portion 13 are connected to each other, the sealing abutting cover 27 is located between the fixing seat 21 and the flexible water bowl 10 to prevent water from seeping out.

It is worth mentioning that the sealing abutment cover 27 comprises a diverter head 271 which is aligned with the water port 211 of the fixing seat 21, wherein when the water bowl connecting portion 26 is connected to the switch fixing portion 13, the diverter head 271 enters the flexible water bowl 10 through the water inlet 12 of the flexible water bowl 10, so that when the water access hole 221 of the displacement valve 22 is aligned with the water port 211, the pet keeper can squeeze the bottle body 30 so that the water stored in the cavity 31 of the bottle body 30 passes through the opening 32, the water port 211, the water access hole 221, and the water inlet 12 to enter the flexible water bowl 10 through the diverter head 271, so as to avoid an excessive large squeezing force applied on the bottle body 30 by the pet breeder which causes the water being sprayed out of the flexible water bowl 10.

In particular, in this embodiment of the present invention, the sealing sleeve member 225, the sealing ring 251 and the sealing abutting cover 27 are all made of silicone material, so as to ensure the waterproof performance of the sealing sleeve member 225, the sealing ring 251 and the sealing abutment cover 27, so as to ensure the airtightness of the water bottle 100 for pet. In some embodiments of the present invention, the sealing sleeve member 225, the sealing ring 251 and the sealing abutting cover 27 can also be made of other waterproof materials, and the materials are not limited in the present invention.

Furthermore, the switch unit 20 further comprises a water supply pipe 28, wherein one end of the water supply pipe 28 is connected to the water port 211 of the fixing seat 21, and the other end of the water supply pipe 28 passes through the opening 32 of the bottle body 30 and enters the cavity 31, the length of the water supply pipe 28 is set to allow the pet breeder to squeeze the bottle body when the water level of the cavity 31 is relatively low. The water in the cavity 31 of the bottle body 30 is fed into the flexible water bowl 10, so as to improve the practicability of the water bottle 100 for pet and preventing the waste of water resources.

In particular, the water supply pipe 28 comprises a filter head 281 which is arranged at one end of the water supply pipe 28 located in the cavity 31 to filter the water entering the flexible water bowl 10. The filtration prevents contaminated water or impurities in the water from entering the flexible water bowl 10, and ensures the quality and safety of drinking water for the pet, thereby ensuring the health of the pet.

It is worth mentioning that, in order to facilitate the carrying and transportation of the water bottle 100 for pet by the pet breeder, the bottle body 30 further comprises a strap 34 which is sleeved on the bottle body. The strap 34 comprises at least a harness buckle 341 and a harness 342, wherein the harness 342 is detachably connected to the harness buckle 341, so that the pet breeder can carry the water bottle 100 for pet by the harness 342, which further facilitates the carrying and transportation of the water bottle 100 for pet.

In particular, the length of the harness 342 is allowed to be adjusted, so that the pet breeder can adjust the length of the harness 342 according to the carrying requirements, so as to adjust the carrying manner of the water bottle 10 for pet, such as hand hold, diagonal across the back or carry it on the back, so that the carrying ways of the water bottle 100 for pet are enriched, rendering a good utilization experience of the pet breeder.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and are subject to change without departure from such principles.

What is claimed is:

1. A water bottle for pet, comprising:
a flexible water bowl having a top opening and a water inlet provided at a bottom thereof;
a bottle body having a cavity and an opening communicating said cavity to the outside, wherein said cavity is adapted for being filled with water through said opening, wherein said bottle body is coupled to said flexible water bowl in such a manner that water is allowed to be fed into said flexible water bowl through said water inlet; and
a switch unit arranged between said flexible water bowl and said bottle body, wherein said switch unit comprises a fixing seat and a displacement valve which is arranged to be capable of moving with respect to said fixing seat, wherein said fixing seat has a water port which is aligned with said water inlet of said flexible water bowl, said displacement valve has a water access hole and a water sealing member, wherein one of said water access hole and said water sealing member is selectively aligned with said water port by relative movement between said displacement valve and said fixing seat, wherein when said water access hole is aligned with said water port, said water port is communicated to said water inlet through said water access hole, and when said water sealing member is aligned with said water port, said water port is closed by said displacement valve.

2. The water bottle for pet according to claim 1, wherein said fixing base comprises two limiting walls which are arranged on a same side of said fixing base in a state of being parallel to each other, wherein a displacement channel is formed between said two limiting walls, wherein said water port is disposed in said displacement channel, and said displacement valve is arranged in said displacement channel to be displaced in a direction parallel to said limit walls, so as to be retracted into or rejected out of said displacement channel.

3. The water bottle for pet according to claim 2, wherein said switch unit comprises an elastic member, wherein an abutting wall is provided on said fixing seat at one end of said displacement channel, and one end of said elastic member is fixed on said abutting wall, the other end of said elastic member is biasing against said displacement valve, so as to push said displacement valve to pop out from the other end of said displacement channel.

4. The water bottle for pet according to claim 3, wherein said switch unit comprises a positioning rod which comprises a first connecting arm and a second connecting arm, wherein said first connecting arm of said positioning rod is connected to said fixing seat, and said second connecting arm of said positioning rod is connected to said displacement valve, so as to retain said displacement valve in said displacement channel.

5. The water bottle for pet according to claim 4, wherein said elastic member is a spring.

6. The water bottle for pet according to claim 5, further comprising a guiding column provided on said abutting wall, wherein said guiding column is sleeved by said elastic member.

7. The water bottle for pet according to claim 6, wherein said displacement valve has a guiding cavity disposed at a side thereof facing towards said elastic member, wherein said the other end of said elastic member is biasing against a cavity wall of said guiding cavity.

8. The water bottle for pet according to claim 4, wherein one of said limiting walls of said fixing base is formed with a rod retaining hole, and wherein said first connecting arm of said positioning rod is engaged with said rod retaining hole to connect said positioning rod to said fixing seat.

9. The water bottle for pet according to claim 8, wherein a side of said displacement valve facing said limiting wall which is connected to said positioning rod is provided with a rod displacement groove, wherein said second connecting arm of said positioning rod is engaged with said rod displacement groove, wherein when said displacement valve is displacing in said displacement channel, said second connecting arm moves in said rod displacement groove.

10. The water bottle for pet according to claim 9, wherein said rod displacement groove is provided with a guiding rod retaining buckle which comprises a buckle end, wherein said positioning rod is coupled with said rod displacement groove in such a manner that when displacement valve is retracted into said displacement channel, said second connecting arm is bucked and retained at said buckle end of said guiding rod retaining buckle, and when said displacement valve is ejected out through displacement channel, said second connecting arm is bucked and retained at an edge of said rod displacement groove.

11. The water bottle for pet according to claim 10, wherein said guiding rod retaining buckle comprises a guiding end having at least one inclined surface for guiding a movement path of said second connecting arm which moves in said rod displacement groove.

12. The water bottle for pet according to claim 1, wherein said displacement valve comprises a sealing sleeve member which is adapted to an aperture of said water access hole and said water sealing member, wherein said sealing sleeve member is arranged in a state of surrounding said water access hole and said water sealing member.

13. The water bottle for pet according to claim 2, wherein said bottle body comprises an opening connecting portion disposed near said opening and surrounding said opening, and said switch unit comprises a cap connecting portion which is matched with said opening connecting portion, wherein said cap connecting portion is detachably coupled to said opening connecting portion, so as to allow said opening to align with said water port.

14. The water bottle for pet according to claim 13, wherein said cap connecting portion is provided on a side of said fixing seat opposite to said side of said fixing seat on which said limiting walls are provided.

15. The water bottle for pet according to claim 14, wherein said opening connection portion and said cap connection portion are mutually mating threads.

16. The water bottle for pet according to claim 15, wherein said switch unit comprises a sealing ring disposed in said cap connecting portion, wherein when said cap connecting portion and said opening connecting portion are connected to each other, said sealing ring is tightly pressed between said cap connecting portion and said opening connecting portion.

17. The water bottle for pet according to claim 13, wherein said flexible water bowl comprises a switch fixing portion provided at a bottom thereof, wherein said switch unit comprises a water bowl connecting portion matched with said switch fixing portion, wherein said water bowl connecting portion and said switch fixing portion are detachably connected to align said water port with said water inlet.

18. The water bottle for pet according to claim 17, wherein said flexible water bowl further comprises a switch accommodating portion surrounding said switch fixing portion, wherein when said water bowl connecting portion and said switch fixing portion are connected to each other, said switch unit is accommodated in said switch accommodating portion.

19. The water bottle for pet according to claim 18, wherein said switch fixing portion and said water bowl connecting portion are detachably connected in a snap-fit manner.

20. The water bottle for pet according to claim 18, wherein said switch unit comprises a sealing abutting cover which is buckled on said side of said fixing seat provided with said limiting walls.

21. The water bottle for pet according to claim 20, wherein said sealing abutment cap comprises a diverter head aligned with said water port of said fixing seat, wherein when said water bowl connecting portion is connected to said switch fixing portion, said diverter head enters said flexible water bowl through said water inlet of said flexible water bowl.

22. The water bottle for pet according to claim 1, wherein said top opening of said flexible water bowl is configured in an inclined state.

23. The water bottle for pet according to claim 21, wherein said switch unit further comprises a water supply pipe, wherein one end of said water supply pipe is engaged with said water port of said fixing seat, and the other end of said water supply pipe is inserted into said cavity through said opening of said bottle body.

24. The water bottle for pet according to claim 23, wherein said water supply pipe comprises a filter head disposed on said the other end of said water supply pipe located in said cavity.

25. The water bottle for pet according to claim 1, wherein said bottle body further comprises a strap which is sleeved on said bottle body, wherein said strap comprises at least a harness buckle and a harness, wherein a length of said harness is capable of being adjusted, wherein said harness is detachably connected to said harness buckle.

* * * * *